Nov. 12, 1957 C. R. FELMLEY, JR 2,813,190
MULTIPLE ARC WELDING
Filed Nov. 1, 1954

INVENTOR
CHARLES R FELMLEY Jr
BY
ATTORNEY

United States Patent Office 2,813,190
Patented Nov. 12, 1957

2,813,190

MULTIPLE ARC WELDING

Charles R. Felmley, Jr., Livingston, N. J., assignor to Air Reduction Company, Incorporated, New York, N. Y., a corporation of New York Application November 1, 1954, Serial No. 466,013

10 Claims. (Cl. 219—76)

This invention relates to inert-gas-shielded, metal arc welding in which a consuming electrode wire is used.

It is the primary object of the instant invention to provide a dual-arc, dual consuming electrode, inert-gas-shielded, metal-spray welding process which is adapted to effect overlays.

A further and more particular objective is to provide a soft, sound ferrous overlay band on a curved ferrous surface, such as an artillery shell.

The achievement of the foregoing objects and others, along with the advantages and features of the invention, will be apparent from the following description and the accompanying drawing in which.

Figure 1:
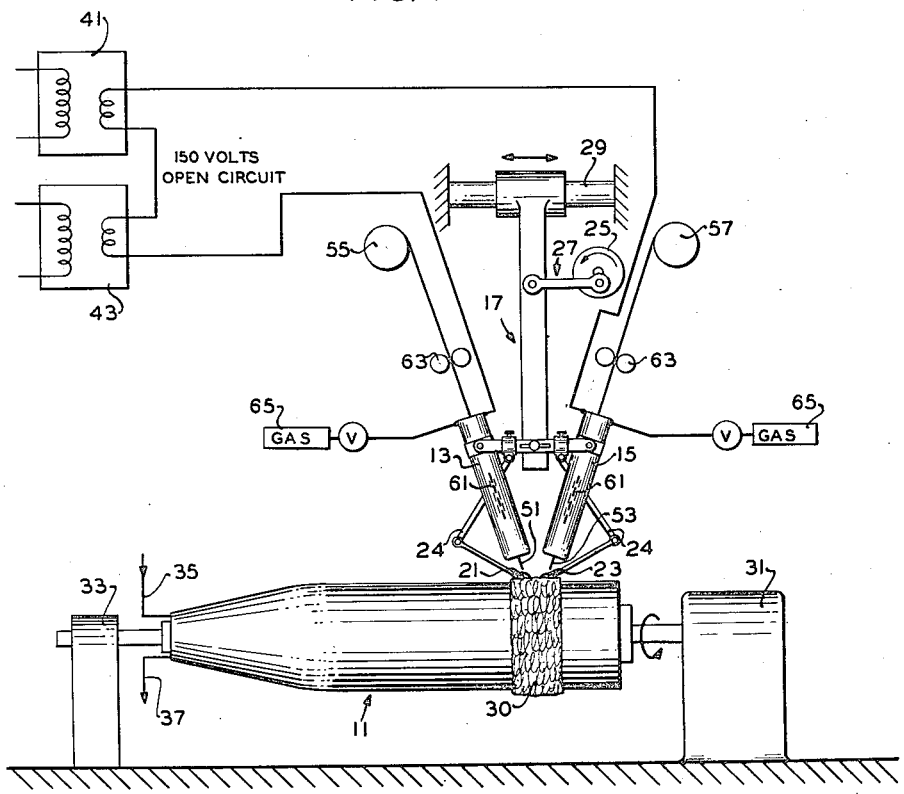
Fig. 1 is a schematic showing of apparatus for effecting the preferred embodiment of the instant invention as applied for overlaying an artillery shell.

The recently-developed, inert-gas-shielded, metal arc, consuming electrode welding process which is disclosed in Muller et al. U. S. Patent No. 2,504,868 has greatly facilitated the welding of difficult-to-weld materials, such as aluminum, and has been widely used for the welding of such materials, as well as steel. Subsequent developments have been directed towards modifications in the basic process and other processes which will permit the welding with welding currents which are other than direct current reverse polarity, i. e., when the electrode wire is positive and the workpiece is negative. Thus, in the U. S. patent applications, S. N. 288,447 and 288,448 filed by Muller on May 17, 1952 (assigned to applicant's assignee; now respectively U. S. Patents Nos. 2,694,763 and 2,694,764; issued November 16, 1954), there are disclosed inventions relating to the welding with activating agents so that activated wires result, when the welding current is direct current straight polarity (electrode wire is negative) or is alternating current. An activating agent is an agent which is effective to produce, in the straight polarity arc, metal transfer characteristics and electrode burn-off characteristics approximating those of the reverse polarity arc. A welding wire which is lightly coated with such an agent, for example rubidium carbonate, can be referred to as an activated wire. Other suitable activating or emissive agents are set forth in the above-cited Muller patents (2,694,763 and 2,694,764) and in "Electric Arc and Resistance Welding—IV" (dated July 1954 and published by the American Institute of Electrical Engineers) beginning at page 61. The instant invention resulted primarily from the desire to utilize certain features of the basic process and of subsequent developments in work of the overlay type where a large quantity of metal is required to be deposited very rapidly and usually without dilution of the overlay with the workpiece. After extensive experiments, the many factors affecting arc stability, metal transfer, soundness, dilution, deposition rate, and under-cutting were resolved and an improved, practical overlay process resulted. It was discovered that inert-gas-shielded, closely spaced independent arcs of opposite polarity would satisfactorily and efficiently effect metal spray transfer from both of two consuming electrode wires to a single weld pool when at least the negative wire is activated.

The basically essential and cooperating features of the instant invention are opposite polarity of the arcs, metal spray transfer, adequate inert gas shielding, and activated electrode wires. The opposite polarity is preferably derived from A. C. power. Other significant preferred features especially for steel overlay work are argon with 1% oxygen for the shielding gas, and a rubidium carbonate coating on the electrode wires.

One of the specific problems which led to the instant invention was the banding of artillery shells. The mechanical fastening or banding of copper or copper alloy rotating bands to artillery shells is a serious problem during war when the supply of copper is short. Such bands have several other disadvantages, two of the more important disadvantages are the occasional loosening of bands during firing and the high cost of copper. It was believed that welding a band-like ferrous deposit on the artillery shell would eliminate these disadvantages provided an efficient process could be evolved. Some of the problems which were anticipated or encountered were porosity, cracks, excessive hardness in the band, excessive weld spatter and a relatively slow welding speed. In overcoming the problems connected with ferrous shell banding, the above-mentioned features of the instant invention were first evolved. The combination of inert-gas-shielded, stable dual arcs of opposite polarity, and activated consuming electrodes in a welding process provided for suitable metal spray transfer. Attempts to effect the desired overlay on killed steel, artillery shells with a single-arc technique were not entirely satisfactory since the band was too hard and the welding time was excessive. It was desired that the required overlay be made in one revolution of the shell. Next, consideration turned to two arcs. Investigations with dual arcs made it clear that two closely-spaced, inert-gas-shielded arcs from consuming ferrous electrodes could not be used for overlay work, if the arcs have the same polarity at any instant. The arc plasmas attempt to combine into one arc which is very unstable and uncontrollable. In using arcs of opposite polarity, as obtained with A. C. series connected power, one of the arcs has reverse polarity, while the other arc has straight polarity at any instant. Experiments had indicated that reverse polarity with a single arc gave greater penetration than with straight polarity, and so contributed to hardness in the overlay due to carbon and manganese pick-up from the shell. The straight polarity electrode wire, of course, was coated with an activating agent in accordance with the above-mentioned patent application. It was determined that it was possible to establish two closely spaced arcs of opposite polarity without the activating agent at the straight polarity arc being adversely affected by the reverse polarity arc with the result that metal spray transfer and similar burn-off rates were obtained at each arc. It was also found that by coating both wires with an activating agent that the reverse polarity arc produced less dilution and produced comparable arc voltages to straight polarity with D. C. power supplies. Thus, equalization of the arc penetration was substantially obtained by using two activated electrode wires. With A. C. current, the activating agent also improves the restriking of the arc as well as facilitating metal transfer during the straight polarity period. The possible problem of unequal penetration due to arcs of opposite polarity was further minimized by oscillating the two consuming electrode wires and the two filler wires.

The problem of porosity in the overlaying of artillery shells with a soft band is apparent when the compositions of the overlay material and the shell are considered. The shell is made from killed steel. The following chemical analysis is typical of the stell shell body:

| | |
|---|---|
| Carbon | 0.50 |
| Manganese | 0.88 |
| Phosphorus | 0.013 |
| Sulfur | 0.027 |
| Silicon | 0.15 |

The above composition shows that there is a relatively large amount of carbon, insofar as weldable steels are concerned. The overlay material or welding wires must necessarily result in a soft band and hence must be low in carbon. Towards this end, low metalloid iron is used, such as rimmed steel. The ingot-iron electrode wire and auxiliary wire which were used had about the following composition:

| | |
|---|---|
| Carbon | 0.04 |
| Manganese | 0.06 |
| Phosphorus | 0.02 |
| Sulfur | 0.02 |
| Silicon | 0.01 |

Since this wire is not deoxidized, it contains an excessive amount of available oxygen. Thus, the shell contributes carbon to the weld pool while the welding wires constitute a source of oxygen. Under these conditions the rimming action (carbon plus oxygen to give carbon monoxide or dioxide) can easily occur and must be prevented in order to avoid porosity due to entrapment of gas bubbles. This is accomplished by the addition of aluminum in the form of a coating on the auxiliary wire to the weld pool. The aluminum preferentially reacts with oxygen since aluminum is a strong deoxidizer. The instant aluminum-coated auxiliary wire minimized spatter which sometimes occurred at the straight polarity arc. A further and more significant benefit results from feeding aluminum to the weld pool in the form of a coating on the auxiliary wire, when the amount of aluminum is such that a complex aluminum oxide skin forms on top of the molten puddle. The viscous aluminum oxide film permits welding when the weld pool would normally tend to flow due to gravity (as with a curved surface). In this manner, weld pool retention is achieved.

Figure 2:
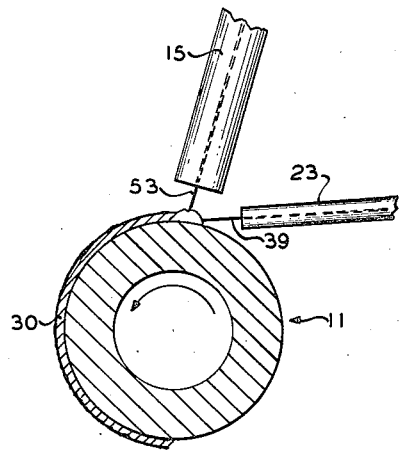
Fig. 2 is a schematic side view, partially in cross-section, showing one electrode wire and one auxiliary wire being fed to the overlay.

Referring to Figs. 1 and 2 of the drawing, it can be seen from the schematic showing that a 90-mm. artillery shell 11 is horizontally mounted in a lathe-type device for axial rotation. The rotation is counterclockwise as observed from the right end of the shell. Two water-cooled, inert-gas, automatic welding heads 13 and 15 are positioned above the shell and are held by a suitably adjustable frame 17. Two auxiliary wire feeders 21 and 23 are located behind the shell as seen in Fig. 1 and are also adjustably connected to the frame by bracket means 24. Since the frame 17 is connected to an oscillating mechanism 25 by linkage 27 and frame 17 is slidably mounted on the bar 29, the welding heads and wire feeders will oscillate together, transversely of the band, as the band or overlay 30 is put down.

The lathe-like mechanism includes a variable speed drive motor 31 and a tail stock device 33, both having conventional means for holding the shell. The shell was preferably water-cooled, as schematically indicated by water inlet 35 and outlet 37.

The welding heads 13 and 15 are similar in operation to the apparatus which is shown in the first, above-mentioned Muller patent. Since the details form no part of the instant invention, they are not shown in detail but only schematically. It is sufficient to know that a high wire speed, a proper current supply to the wire and suitable shielding of the arc are effected. The welding current supply is series-connected A. C. transformers 41 and 43 having primary coils connected to a 60-cycle, 440-volt supply and having secondary windings adapted to supply 150 volts open circuit. No electrical connection is made to the shell. The auxiliary wire feeders 21 and 23, feeding wires 39 (see Fig. 2) are conventional items of the type utilized to feed filler wire to an inert-gas-shielded, consumable electrode process. Only the top segments of the feeders 21, 23 appear in Fig. 1. The welding heads and associated structure are such as to provide a non-turbulent, inert-gas-shielding of the weld pool, arcs and electrode wire tips, and metal spray-transfer of the metal which is melted from the tip of the wire.

The electrode wires 51, 53 project about a half of an inch from the orifice of the gas nozzle of the welding heads 13, 15. The wires 51, 53 are supplied from wire reels 55, 57 and are pulled to the welding heads and pushed through the electric contact tubes 61 in the heads by feed rollers 63. The shielding gas is obtained from gas supplies 65 through suitable valved conduits. The two leads from the transformers are connected to the welding heads and further connections (not shown) lead to the contact tubes 61.

Referring to Fig. 1 of the drawings, it can be seen that the included angle between the electrode wires 51, 53 is about 44 degrees. The average length of the vertical arcs is about 5/16 of an inch. The distance between the adjacent sides of the arcs at the workpiece is about 1/2 of an inch. With the specified polarities, arc length, and gap between arc plasmas, the essential feature of maintaining independent arcs is achieved. With reference to Fig. 2, it can be seen that the electrode wires are inclined to the vertical by about 22 degrees and that the projected axis of the wires hit the 90-mm. shell at a point which is slightly off top center. The horizontal distance from a vertical longitudinal plane through the center of the shell to where the projected axis of an electrode wire hits the shell surface is about 3/4 of an inch. The auxiliary wires 59 are fed to the front of the weld pool at an angle such that the wire will penetrate slightly towards the bottom of the weld pool (not shown).

From the foregoing, it is apparent that independent arcs of opposite polarity are formed and that an auxiliary wire is fed to the front edge of the weld pool at a silght angle, downwardly into the weld pool. The width of oscillation of the arcs or the transverse travel is 3/4 of an inch. The preferred frequency is 60–90 cycles per minute. The rate of metal deposit is 23 pounds per hour. The shell overlay is made in one revolution in about 1.6 minutes. The overlay or band 30 measures about 1½ inches wide and ⅛ inch thick. The band could be made wider or narrower, if desired.

The electrode wire was prepared by cleaning the wire in an electrolytic acid bath, washing and drying, and then dipping in a bath of the activating agent, rubidium carbonate (25 grams per liter of distilled water). The wire was then dried in a hot air blast. The activating agent is a very thin, current conducting coating which suitably modifies the metal transfer and arc chracateristics. It also reduces penetration on reverse polarity.

The preferred method and conditions for depositing a wide ferrous overlay on an artillery shell will now be described. Two semi-automatic weld heads with constant wire feed, two auxiliary wire feeders and an oscillating mechanism were positioned as shown in the drawing. The electrode wires were 1/16 inch diameter, ingot-iron wires coated with rubidium carbonate, the preferred activating agent. The auxiliary wires were 1/16 inch diameter ingot-iron wires coated with 1.25% by weight of aluminum. The aluminum-coated wires were used in order to deoxidize the weld metal and to form an oxide skin which reduces spatter and retains the molten weld metal on the curved surface of the shell. The aluminum also gives a more square and flat band, due to the viscous film. An open-circuit voltage of 110–150 volts was required to start and maintain the two A. C. arcs. With this power source, it is to be appreciated that one arc will be of reverse polarity while the other is straight polarity. No electrical connection was made to the shell and the shell became a part of the electrical circuit only when the welding arcs were established. The welding conditions were 320 amperes; 19–21 volts for each arc; 30 C. F. H. of argon plus 1% oxygen in each head; 135 I. P. M. (inches per minute) for the wire feed speed of electrode wires; and 75 I. P. M. for the auxiliary wires.

The results with the preferred conditions were very satisfactory. The welding time for a band 1½ inches wide and ⅛ inch thick was 1.6 to 1.8 minutes. The band had an average Rockwell B surface hardness of about 71 at a band diameter of 3.65 inches. The weld dilution (the ratio of area of melted shell to total area of melted metal) was 9.3%. The chemical analysis of the welded overlay material was about carbon—0.065%; manganese—0.10%; aluminum—0.33%; and aluminum oxide —0.065%. The weld metal was free of porosity and minimum spatter was obtained during welding operation. The weld penetration across the band width was uniform and the amount of dilution with the shell material was lower than that obtained by most other methods. Studies of the two welding arcs by high-speed motion pictures showed that good arc stability and metal spray transfer were obtained. The movies also showed that the molten weld metal was fully deoxidized by the addition of aluminum-coated auxiliary wires as the weld metal was very calm and did not boil. The retention of the weld pool by the aluminum oxide skin film was apparent. There was no undercutting at either edge of the overlay. A production run of 150 shells (90-mm.) with the preferred conditions proved clearly that porosity-free, crack-free, and soft rotating bands consistently can be deposited.

The approximate quantities of wire and gas to produce the described band on a 90-mm. shell are 0.4 lb. of emissive-coated electrode; 0.2 lb. of aluminum-coated auxiliary wire; and 2 cu. ft. of argon plus 1% oxygen.

Another suitable auxiliary wire is the so-called ½ T steel wire which was aluminum-coated and has the following composition:

| | |
|---|---|
| Carbon | 0.05 |
| Manganese | 0.17 |
| Phosphorus | 0.025 |
| Sulfur | 0.035 |
| Silicon | 0.03 |

Other low metalloid wires can be used as auxiliary or electrode wires.

An essential feature of the instant invention is the fact that the arcs are essentially independent. It is to be noted that projections of the electrode wires toward the work would not intercept above the workpiece. The repulsion between arcs of opposite polarity assists in preventing any common arc plasma, although basically the independent arcs are achieved by proper positioning of the wires. The distance between the adjacent edges of the arc plasmas is preferably about a half of an inch. Furthermore, it is definitely preferred that the independent arcs be substantially vertical, rather than inclined away from or toward each other.

The opposite polarity feature of the instant invention can be achieved by using D. C. power supplies. All other features are the same as with A. C. series arcs. The D. C. circuits can be referred to as (1) a D. C. series-arcs circuit and (2) a D. C. dual-arcs circuit. As is the instantaneous situation with the preferred A. C. series arcs, the D. C. arcs have opposite polarity by suitably arranging the circuits. One D. C. arc is direct current reverse polarity (DCRP) and the other arc is direct current straight polarity (DCSP). The D. C. series-arc circuit is made by connecting the positive lead from a suitable generator to one welding head and the negative lead to the other welding head. With this circuit, results which are similar to the A. C. circuit were obtained, although dilution was somewhat greater than with the A. C. circuit. The melting rate of the DCSP arc was made similar to the DCRP arc by coating the DCSP wire with an activating agent. The D. C. dual-arcs circuit is made by energizing each welding head with a separate, D. C. power supply. One lead from each power supply was connected to each of the electrode wires to give opposite polarity arcs. The second lead from each welding generator was connected to the shell. Results comparable to the preferred A. C. method were obtained, although occasional undercutting and poor wetting occurred on the DCSP side.

With both D. C. circuits, a metal spray transfer was effected by the DCSP arc from an activated wire and the closely-adjacent but independent DCRP arc without adverse effect on each other. Furthermore, the activating agent on the DCRP wire permitted the establishment of an arc having an arc voltage which is similar to the DCSP arc. Both of these results were, of course, achieved by the preferred A. C. series-arcs method, as above-mentioned. With these D. C. circuits, it was again noted that the oxygen addition for improved wetting did not adversely affect the metal transfer.

It is to be appreciated that the instant invention can be used to overlay material on a horizontally-disposed plate or surface, with relative movement between the flat plate or surface and the welding apparatus. With flat work, the auxiliary wires are directed towards the bottom of the weld pool. The electrode wires are fed vertically insofar as transverse planes are concerned but are fed inclined with respect to a plane perpendicular to the direction of the weld bead. It is also believed that the instant invention can be used to effect fillet and butt welds.

The general utility of the instant invention has been proved by depositing various carbon steels on different carbon steels, stainless steels on carbon steels, or stainless steels, high alloy steels on carbon steels, nickel-copper alloy and nickel on carbon steel. The A. C. circuit is preferred as in rubidium carbonate as the activating agent. The auxiliary wires are aluminum-coated only when deoxidation of the weld deposit or weld pool retention is required.

While the invention is particularly useful for overlay work on ferrous metals as described above, it can also be used for other purposes and with other workpiece, electrode, and filler wire metals.

It is to be appreciated that the preferred form of the instant invention has particular applicability to overlay work since this type of work requires that there be a minimum of migration of the elements of the workpiece into the overlay or vice versa. This requirement is obvious in effecting shell banding where the band must be soft relative to the shell and in effecting a stainless steel deposit where the overlay must remain corrosive-resistant.

It is believed that the addition of the auxiliary wires minimizes the amount of penetration as well as increasing the deposition rate. Oscillation of the arcs helps to reduce dilution and produces a mixing action so that the deposited metal is more uniform than when a stringer bead technique is employed.

It will be understood that this invention is not limited to the specific illustrative embodiments thereof, described above, but includes such modifications thereof as fall within the scope of the following claims.

I claim:

1. The method of depositing molten metal on a workpiece simultaneously from a plurality of continuously fed closely spaced consumable wire electrodes, comprising, establishing an inert gas shielded welding arc between each of said wire electrodes and said workpiece, each of the arcs having the edge of its arc plasma spaced a small distance from the edges of the arc plasmas of the adjacent arcs supplying current to said arcs in a sense to maintain adjacent arcs in opposite polarities and in an amount sufficient to project molten metal as a spray of fine droplets within the gas shield from each of said wire electrodes to said workpiece, and continuously supplying to at least the arcs of straight polarity an agent which is effective to produce in the straight polarity arcs metal transfer characteristics and electrode burn-off characteristics approximating those of the reverse polarity arc.

2. A method according to claim 1 in which the arc current is alternating so that adjacent arcs alternate in polarity.

3. The method of depositing metal on a workpiece comprising establishing two independent closely-spaced arcs of opposite polarities; one of said arcs being between a first consuming electrode wire and said workpiece; the other of said arcs being between a second consuming electrode wire and said workpiece; feeding said wires toward the arc at a rate of at least 100 inches per minute; supplying the welding current to said wires at a strength sufficient to melt said wires and to project the melted wires as a metal spray; positioning the ends of said wires so that the projected metal forms a part of a single weld pool; said arcs having their adjacent arc plasmas spaced a small distance from each other; shielding said arcs and said weld pool with an inert gas; and providing the tip of the wire which is negative with an activating agent.

4. The method of depositing metal on a workpiece comprising establishing two closely-spaced independent arcs of opposite polarities; one of said arcs being between a first consuming electrode wire and said workpiece; the other of said arcs being between a second consuming electrode wire and said workpiece; feeding said wires toward the arc at a rate of at least 100 inches per minute; supplying the welding current to said wires at a strength sufficient to melt said wires and to project the melted wires as a metal spray; positioning the ends of said wires so that the projected metal forms a part of a single weld pool; shielding said arcs and said weld pool with an inert gas; and providing the tips of said wires with an activating agent.

5. The method of depositing steel metal on a steel workpiece comprising establishing two closely-spaced independent arcs of opposite polarities; one of said arcs being between a first consuming steel electrode wire and said workpiece; the other of said arcs being between a second consuming steel electrode wire and said workpiece; feeding said wires toward the arc at a rate of at least 100 inches per minute; supplying the welding current to said wires at a strength sufficient to melt said wires and to project the melted wires as a metal spray; positioning the ends of said wires so that the projected metal forms a part of a single weld pool; and further so that the adjacent edges of said arcs are spaced a small distance apart; shielding said arcs and said weld pool with argon containing 1% oxygen and providing the tip of the wire which is negative with rubidium carbonate.

6. The method of depositing a metal on a workpiece comprising establishing a flow of alternating current from a first, activated, consuming electrode wire through a weld pool to a second activated consuming electrode wire so that arcs of opposite polarity result; shielding said arcs, said weld pool and said wires with an inert gas; regulating the arc length, wire feed, voltage and current so that metal spray transfer is effected; positioning said wires so that molten metal is transferred into a single weld pool and so that said arcs have the adjacent edges of their arc plasmas spaced apart about one half of an inch and oscillating said electrode wires; and effecting relative movement in the direction of deserved deposition between said workpiece and said electrode wires.

7. The method of depositing a metal in a workpiece made from a killed steel comprising establishing a flow of alternating current from a first activated consuming electrode wire through deposited molten metal to a second activated consuming electrode so that two arcs of opposite polarity are formed; said electrode wires being made of ingot-iron; shielding said arcs with argon; regulating the arc length, wire feed, voltage and current so that metal spray transfer is effected; positioning the consuming ends of said wires so that molten metal is transferred into a single weld pool and two closely-spaced independent, vertical arc plasmas exist; melting auxiliary aluminum-coated ingot-wires into said pool; oscillating said auxiliary wires; and said workpiece having a curved surface on which said weld pool is formed.

8. The method of depositing a ferrous overlay on a curved surface of a ferrous body comprising establishing two independent closely-spaced, inert-gas-shielded, A. C. series-circuit arcs between two consuming electrodes and said surface; said electrodes being made of ingot-iron and coated with rubidium carbonate; said inert gas being argon; transferring metal from said electrodes as metal spray and forming a single weld pool; effecting relative movement in the direction of desired deposition between said surface and said electrodes, and feeding two aluminum-coated auxiliary ferrous wires to the leading portion of said weld pool.

9. The method of rapidly depositing metal comprising establishing two independent closely-spaced, inert-gas-shielded arcs of opposite polarity from two consuming electrode wires having a coating of an activating agent; transferring metal from said wires as projected metal spray; positioning said electrode wires so that a single weld pool is formed from the metal projected by said arcs; feeding two auxiliary wires slightly downwardly into the leading part of said weld pool; one of said auxiliary wires entering said pool at the location of the arc plasma of one arc; the other of said auxiliary wires entering said pool at the location of the arc plasma of the other arc; and simultaneously oscillating all of said wires as said weld pool is formed.

10. Apparatus for depositing metal on a workpiece comprised of two inert-gas-shielding welding heads connected to a power supply so that arcs of opposite polarity can be established at each welding head; two spools of activated consuming electrode wire arranged to be supplied separately to each of said welding heads; said welding heads being positioned with respect to each other so that two closely-spaced, independent arcs can be formed; and further so that lines axially projected from said welding heads can intersect below the surface of a workpiece; said welding heads being connected to an inert gas supply; and means for feeding two auxiliary wires into said arcs.

References Cited in the file of this patent

UNITED STATES PATENTS

| | | |
|---|---|---|
| 1,477,538 | Carter et al. | Dec. 18, 1923 |
| 1,884,712 | Jerabek | Oct. 25, 1932 |
| 2,053,417 | Brace | Sept. 8, 1936 |
| 2,299,747 | Harter | Oct. 27, 1942 |
| 2,504,868 | Muller et al. | Apr. 18, 1950 |
| 2,669,640 | Outcalt et al. | Feb. 16, 1954 |
| 2,694,764 | Muller | Nov. 16, 1954 |

FOREIGN PATENTS

| | | |
|---|---|---|
| 709,533 | Great Britain | May 26, 1954 |
| 1,051,528 | France | Sept. 16, 1953 |